Nov. 6, 1962     E. L. BEATTY ETAL     3,062,070

MOTION-TRANSMITTING DEVICE

Filed Aug. 16, 1960

INVENTORS
J. E. MARTENS
E. L. BEATTY
BY W. E. Recktenwald
O. J. Rose
ATTORNEY

United States Patent Office

3,062,070
Patented Nov. 6, 1962

3,062,070
MOTION-TRANSMITTING DEVICE
Eldon L. Beatty, Lansing, Ill., and Jack E. Martens, Gary, Ind., assignors to The Anderson Company, a corporation of Indiana
Filed Aug. 16, 1960, Ser. No. 49,905
6 Claims. (Cl. 74—459)

This invention relates generally to motion-transmitting devices and more particularly to devices for converting rotary motion to translatory motion, and vice versa.

There are many different types of screw-and-nut actuators known and patented. This invention relates primarily to the group of actuators using balls or rollers for transmitting the motion and force components from a driving element to a driven element. Some of the known ball actuators use several internal grooves in the outer element of the device for transmitting the forces from the balls to said outer element, such a system being shown in Russell U.S. Patent No. 2,739,491. Other known ball actuators rely on friction for transmitting the forces from the balls to the outer element of the device, such a system being shown in Morris U.S. Patent No. 2,795,149. Both of these systems have disadvantages that limit the usefulness of the devices manufactured thereunder. These disadvantages run to the difficulty of machining internal grooves, maintaining alignment between grooves and openings in the respective parts of the device, slip between friction surfaces, oversized ball problems, and limitations on output loads due to inherent limitations in structure.

It is, therefore, a principal object of this invention to provide an improved motion-transmitting device of the ball nut-and-screw mechanism that overcomes the above-noted disadvantages of the prior structures.

Another object of the invention is to provide a ball nut-and-screw motion-transmitting device of increased load-bearing capacity.

A further object of the invention is to provide a ball nut-and-screw motion-transmitting device having more positive drive between input and output members than former motion-transmitting devices of this type.

A still further object of this invention is to provide an improved ball nut-and-screw device that is commercially feasible to manufacture in a relatively inexpensive manner to produce a device of relatively high efficiency.

Other objects and advantages of the invention will become apparent after the description hereinafter set forth is considered in conjunction with the drawing annexed hereto.

Figure 1:
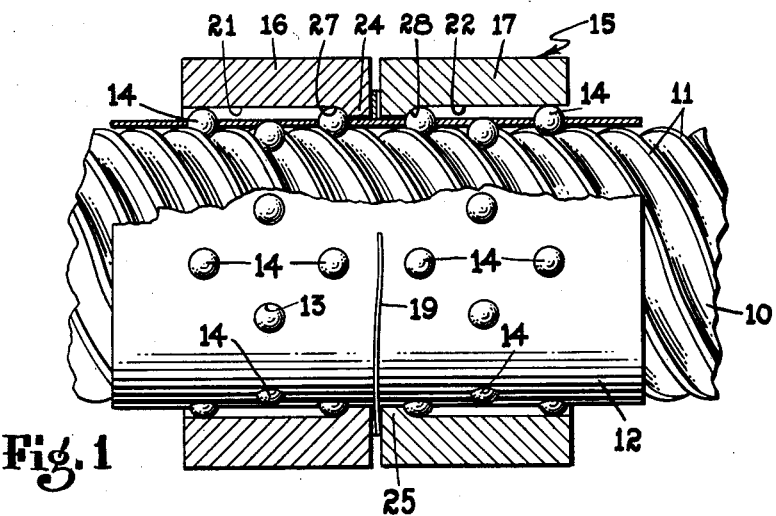
FIGURE 1 is a fragmentary view, partially in cross section, showing a preferred form of motion-transmitting device according to the invention.

With reference to the drawing, a screw 10 is shown as having a plurality of helically formed threads 11 thereon. The screw 10 is adapted to be connected either to the output of a motor so as to be a driving member or to a work load to be moved so as to be a driven member. Loosely surrounding the threads of the screw 10 is a hollow cage or carrier member 12 having a plurality of properly oriented spaced apertures 13 therein for mounting a plurality of balls 14 in engagement with the threads 11 of said screw 10. The apertures 13 generally follow the lead of the threads and are oriented circumferentially so that different groups of apertures lie in common planes, which planes are perpendicular to the axis of the screw and are spaced axially from each other. The carrier member 12 can be made of plastic or metal with the apertures 13 slightly larger in diameter than the balls 14 so as to allow a limited amount of axial shifting to accommodate for slight manufacturing inaccuracies in the raceways or in the threads 11.

Loosely surrounding the cage or carrier member 12 and retaining the balls 14 therein is an outer nut member 15, preferably formed of two halves or race members 16, 17, urged apart by an angular spring member 19. It should be understood, however, that spring member 19 may be replaced by an ordinary flat spacer washer, or the outer nut member 15 may be made in one piece.

The two halves 16 and 17 of the nut member 15 are substantially identical in construction although when assembled they face in opposite directions and have different force couples acting thereon depending upon the direction of rotation of the screw 10. The halves 16 and 17 have substantially smooth cylindrical inner surfaces 21 and 22, respectively, extending inwardly from the opposite axial end portions thereof. Raised portions 24 and 25 are formed in each half 16, 17, respectively, near one end of each half in the general vicinity of the central part of the nut member 15. Raceways 27 and 28 are formed between the raised portions 24 and 25 and the smooth inner surfaces 21 and 22, respectively, and face outwardly in opposite directions from each other. Each raceway 27, 28 is disposed in a plane substantially perpendicular to the axis of the screw 10.

As shown in the drawing by way of example but not as a limitation, the screw 10 is provided with eight separate threads 11. The carrier member 12 is provided with six peripheral rows of balls 14, three rows in each of the outer nut member halves 16 and 17. These rows of balls 14 may contain eight balls, one for each thread, as shown in the center row of each outer nut member half, or they may contain four balls, one for every other thread, as shown in the two end rows of each outer nut member half. It will be understood that variations may be made in the number of threads on the screw and in the number of peripheral rows of balls, and that the number of balls in each peripheral row may be the same as the number of threads on the screw or may be less than the number of threads on the screw, as long as the number of threads is an even multiple of the number of balls in the peripheral row.

The device may be utilized in various ways. For example, screw 10 may be rotatably driven, and outer nut member 15 left free to rotate while carrier member 12 is restrained from rotating, to positively axially translate carrier member 12. Also, screw 10 may be rotatably driven and carrier member 12 left free to rotate while outer nut member 15 is restrained from rotating, to planetarily axially translate outer nut member 15. Further, outer nut member 15 may be rotatably driven and carrier member 12 left free to rotate while screw 10 is restrained from rotating, to planetarily axially translate screw 10. As a still further example, carrier member 12 may be rotatably driven and outer nut member 15 left free to rotate while screw 10 is restrained from rotating, to positively axially translate screw 10. In summary, the device is designed to generally convert linear motion to rotary motion or vice versa in various ways.

Figure 2:
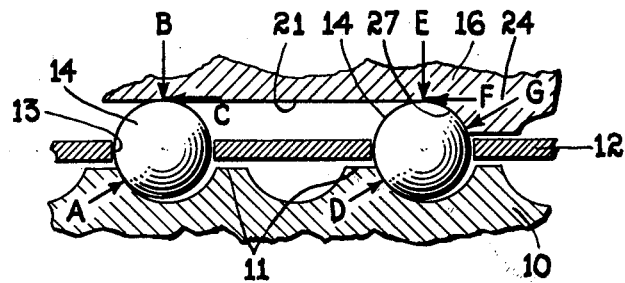
FIGURE 2 is an enlarged fragmentary cross-sectional view of the upper left portion of FIGURE 1, but showing the screw in cross section and illustrating by arrows the location and direction of resultant forces acting on two different balls.
Figure 3:
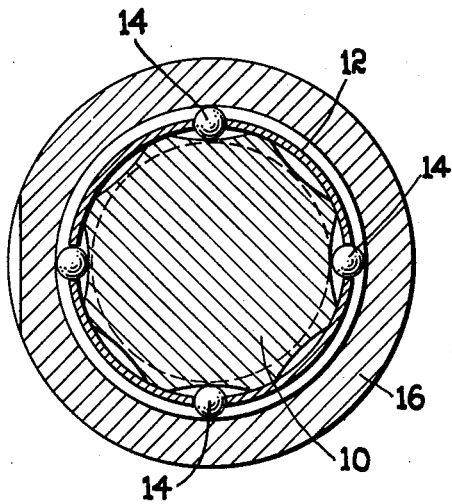
FIGURE 3 is a transverse cross-sectional view of the device.

In FIGURE 2 is shown the generalized case of the way the forces are acting between the screw 10 when rotatably driven by way of example and the nut member 15 driven thereby to the right in said figure. The relatively smooth internal surface 21 of the half 16 of the nut member 15 receives the outward and axial components of force from the left two rows of balls 14 (only one row being shown in FIGURE 2). Due to the shape of the threads 11 on the screw 10, the balls 14 try to roll up the side of the thread as far as the nut member will permit, which results in an angularly directed force A from the side of the thread unto the ball. The half 16 of the nut member 15 resists the force on the ball in two directions, one directed radially inward as force B and one directed axially as force C. The inner row of balls 14, in engagement with the axially outwardly facing raceway 27 formed by the reduced portion 24 of the nut member 15, receive a force D from the side of the thread on the screw 10 which force is transmitted to the raceway 27. The half 16 of nut 15 reacts against the force of the balls by means of the raceway 27 exerting a force G generally axially of the nut 15 and by the smooth inner surface 21 of the half 16 exerting a radial force E and an axial force F thereon. The result is that the forces for driving the output of the device have not only the frictional axially directed forces caused by the reaction of the smooth inner surfaces 21 and 22 of the halves 16 and 17, but also have the positive axial component of reactive forces caused by the raceway 27 in said half 16. All of the balls 14 in half 17 of nut 15 create forces similar to the forces B and C described with respect to the left set of balls in FIGURE 2, the raceway 28 in half 17 not exerting any appreciable force in the movement of the nut to the right. With the accumulative effect of all the forces B and C plus the forces E, F, and G created by the raceway 27, a considerably greater output force is possible with this improved construction. It is believed to be obvious that with the nut 15 being driven in the opposite direction, the raceway 28 will be operative for the forces E, F and G while raceway 27 is not exercising any appreciable forces.

As illustrated in FIGURE 1, a corrugated spring washer 19 is provided between the halves 16 and 17 of the nut member 15. The spring washer urges the two halves axially apart so as to somewhat preload the balls against the threads on the screw and against the raceways 27, 28 and smooth inner surfaces 21 and 22. The preloading accommodates for variations in thread form, ball diameters and slight unevenness in the inner surfaces of the nut member 15. This last-named feature is especially important when the screw 10 is the driving member and the nut member 15 is the driven or output member.

Having thus described a preferred form of our invention, it is obvious that other forms and various modifications may be made and had without departing from the spirit of the invention; and, therefore, we do not wish to be understood as limiting ourselves to the exact forms, constructions, arrangements and combinations of parts herein shown and described.

We claim:

1. In a motion-transmitting device, a helically threaded screw, a carrier member loosely surrounding said screw and having a plurality of rows of spaced-apart balls mounted therein for rolling engagement with the threading of said screw, each of said rows extending around said member, and an outer race member loosely surrounding said carrier member, said race member being formed of two separate halves, each half having a cylindrical inner surface portion engageable substantially in point contact with the balls of one of said rows and a reduced inner diameter portion forming a raceway for the balls of another of said rows, the two halves of the race member being arranged so that the reduced inner diameter portion of each half is adjacent the other half.

2. In a motion-transmitting device, a helically threaded screw, a carrier member loosely surrounding said screw and having a plurality of rows of spaced-apart balls mounted therein for rolling engagement with the threading of said screw, each of said rows extending around said member, and an outer race member loosely surrounding said carrier member, said race member being formed of two separate halves, each half having a straight smooth cylindrical inner surface portion engageable substantially in point contact with the balls of one of said rows and a reduced inner diameter portion forming a raceway for the balls of another of said rows, the two halves of the race member being so constructed and arranged that the reduced inner diameter portions are adjacent each other and the raceways face oppositely and axially outwardly.

3. In a motion-transmitting device, a helically threaded screw, a carrier member loosely surrounding said screw and having a plurality of rows of spaced-apart balls mounted therein for rolling engagement with the threading of said screw, each of said rows extending around said member, an outer race member loosely surrounding said carrier member, said race member being former of two separate halves, each half having a straight smooth cylindrical inner surface portion engageable substantially in point contact with the balls of one of said rows and a reduced inner diameter portion forming a raceway for the balls of another of said rows, the two halves of the race member being so constructed and arranged that the reduced inner diameter portions are adjacent each other and the raceways face oppositely and axially outwardly, and resilient means urging the two halves of said race member apart to effect firm engagement of said raceways with the balls of their respective rows.

4. In a motion-transmitting device, a helically threaded screw, a carrier member loosely surrounding said screw and having a plurality of rows of spaced-apart balls received therein for rolling engagement with the threading of said screw, each of said rows extending around said member, and an outer race member loosely surrounding said carrier member, said race member being formed of two separate halves, each half having a straight smooth cylindrical inner surface portion engageable substantially in point contact with the balls of one of said rows and a reduced inner diameter portion forming a raceway for the balls of another of said rows, the two halves of the race member being so constructed and arranged that the raceways face oppositely and axially outwardly.

5. In a motion-transmitting device, a helically threaded screw, a carrier member loosely surrounding said screw and having a plurality of rows of spaced-apart balls received therein for rolling engagement with the threading of said screw, each of said rows extending around said member, an outer race member loosely surrounding said carrier member, said race member being formed of two separate halves, each half having a straight smooth cylindrical inner surface portion engageable substantially in point contact with the balls of one of said rows and a reduced inner diameter portion forming a raceway for the balls of another of said rows, the two halves of the race member being so constructed and arranged that the raceways face oppositely and axially outwardly, and resilient means urging the two halves of said race member apart to effect firm engagement of said raceways with the balls of their respective rows.

6. In a motion-transmitting device, a helically threaded screw, a carrier member loosely surrounding said screw and having spaced-apart balls received therein for rolling engagement with the threading of said screw, and an outer race member comprising at least two axially spaced-apart portions rotatably surrounding said screw and having a pair of smooth cylindrical inner surface portions extending substantially axially relative to said screw and each of which is engageable substantially in point contact with a plurality of said balls, said race member also having means at least near the center extending closer to the screw than said cylindrical surface portions and being the sole means of said race member extending closer to said screw than said cylindrical surface portions, said means at least near the center forming a pair of oppositely and axially outwardly facing raceways each engageable by a plurality of said balls different from the first-mentioned plurality thereof engageable substantially in point contact with said cylindrical surface portions, said carrier member being freely rotatable relative to said outer race member.

References Cited in the file of this patent

UNITED STATES PATENTS

| | | |
|---|---|---|
| 596,232 | Schmitt | Dec. 28, 1897 |
| 2,328,732 | McKinney | Sept. 7, 1943 |
| 2,407,341 | Meyer | Sept. 10, 1946 |
| 2,768,532 | Russell | Oct. 30, 1956 |
| 2,919,596 | Kuehl | Jan. 5, 1960 |

FOREIGN PATENTS

| | | |
|---|---|---|
| 513,096 | Great Britain | Oct. 3, 1939 |